United States Patent [19]

Haese et al.

[11] 4,394,363

[45] Jul. 19, 1983

[54] PROCESS FOR THE GRANULATION OF PRECIPITATION PRODUCTS FORMED FROM AMMONIUM COMPOUNDS

[75] Inventors: Egon Haese, Bochum; Rolf Willms, Witten; Karl D. Schultheiss, Bochum, all of Fed. Rep. of Germany

[73] Assignee: Dr. C. Otto & Comp. G.m.b.H., Bochum, Fed. Rep. of Germany

[21] Appl. No.: 258,880

[22] Filed: Apr. 29, 1981

Related U.S. Application Data

[63] Continuation of Ser. No. 115,648, Jan. 28, 1980, abandoned.

[30] Foreign Application Priority Data

Jul. 29, 1979 [DE] Fed. Rep. of Germany ....... 2903289

[51] Int. Cl.$^3$ .............................................. C01C 1/02
[52] U.S. Cl. ................................................... 423/356
[58] Field of Search .............. 423/357, 555, DIG. 16, 423/356; 23/313 FB

[56] References Cited

U.S. PATENT DOCUMENTS

| | | | |
|---|---|---|---|
| 2,935,840 | 5/1960 | Schoppe | 261/79 A |
| 3,231,413 | 1/1966 | Berquin | 23/313 FB |
| 3,304,249 | 2/1967 | Katz | 423/659 |
| 3,632,257 | 1/1972 | Ashizawa | 23/313 FB |
| 3,700,461 | 10/1972 | Dickens, Jr. | 23/313 FB |
| 3,849,233 | 11/1974 | Lykov et al. | 23/313 FB |
| 4,088,745 | 5/1978 | Godel | 23/313 FB |
| 4,111,759 | 9/1978 | Didycz et al. | 423/357 |
| 4,183,763 | 1/1980 | Omilinsky et al. | 106/109 |
| 4,294,812 | 10/1981 | Oler | 423/357 |

FOREIGN PATENT DOCUMENTS

| | | | |
|---|---|---|---|
| 668009 | 1/1965 | Belgium | 23/313 FB |
| 557813 | 5/1977 | U.S.S.R. | 23/313 FB |

Primary Examiner—O. R. Vertiz
Assistant Examiner—Wayne A. Langel
Attorney, Agent, or Firm—Thomas H. Murray

[57] ABSTRACT

A process for the granulation of precipitation products, formed from the reaction of ammonium compounds with alkaline-earth compounds, by introducing into the bottom of a reaction chamber an ammonium and alkaline-earth compound such that the alkaline-earth compound in aqueous solution is immediately and intimately mixed with the ammonium compound to form alkaline-earth compound precipitation products in the form of hard granules which are difficultly soluble in water. The alkaline-earth precipitation products are easily withdrawn from the bottom of the reaction chamber without forming a lime sludge which is difficult to remove.

6 Claims, 1 Drawing Figure

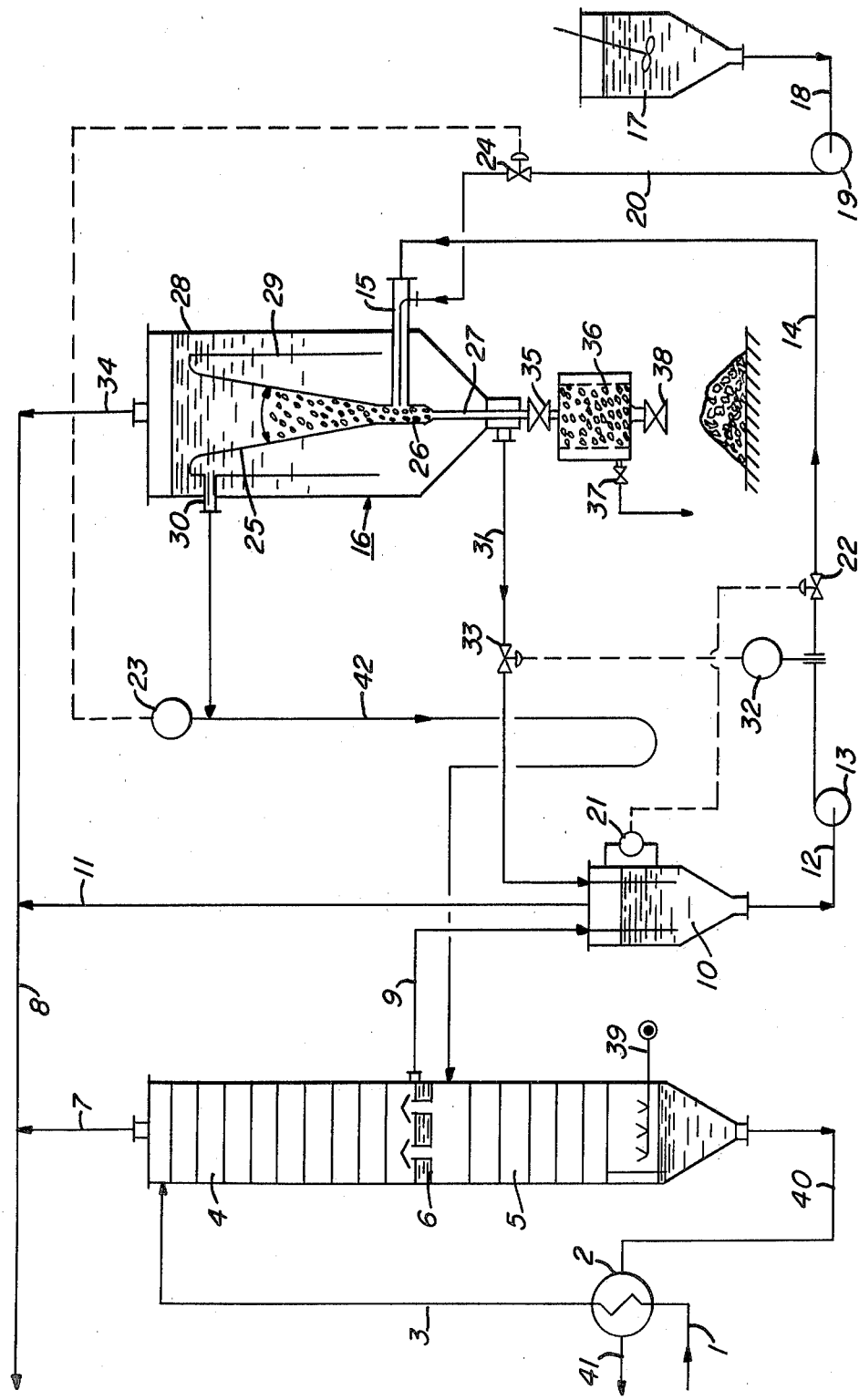

PROCESS FOR THE GRANULATION OF PRECIPITATION PRODUCTS FORMED FROM AMMONIUM COMPOUNDS

This application is a continuation of application Ser. No. 115,648, filed Jan. 28, 1980, now abandoned.

BACKGROUND OF THE INVENTION

In coke oven plants, it is common to utilize ammonia for the removal of sulfur dioxide and other acid components from waste gases, the removal process producing solutions containing ammonium compounds such as ammonium sulfate or ammonium sulfite. In order to recover the ammonia from the ammonium sulfate or ammonium sulfite compounds, the solution is usually mixed with milk of lime (i.e., an aqueous solution of $Ca(OH)_2$) whereby the ammonia is substituted by the calcium. The treated solution is then fed into settling tanks where a sludge consisting of calcium precipitation products is separated. These precipitation products are difficulty soluble in water; but the settling time takes several hours. After settling of the calcium precipitation products, the clear liquid containing the liberated ammonia is usually fed to an ammonia distillation column. The resulting lime sludge consisting of calcium precipitation products is very difficult to remove from the settling tank. The sludge contains at least 50% moisture and, hence, a relatively large amount of dissolved ammonia; however gasification of such sludge (e.g., with water vapor) is expensive since the process must be carried out in closed tanks. Furthermore, problems are encountered in dumping such sludges.

Liquids from coke oven plants contain free and fixed ammonia in addition to other substances. In the past, it has been common to treat such liquids in two stages by stripping the free ammonia in a first stripping stage with vapors from the second stage. The coke oven liquid is fed to the top of a column or scrubber and flows down through a number of exchange trays, the vapor from the second column being introduced from below. In this manner, the free ammonia and other components which are not fixed are distilled off.

To remove the fixed ammonia from the liquid, milk of lime is usually added to the discharge from the first stripping stage. Substitution of the ammonia by calcium causes the ammonia to be liberated, this liberated ammonia being distilled off with water vapor as in the first column. The bottom discharge from the second or lime column contains the lime sludge, calcium sulfate, calcium sulfite, calcium carbonate and other calcium compounds. In the past, this sludge was then separated in subsequent settling tanks and then usually dumped as explained above. Dumping of this material, however, is usually not now permitted under the existing environmental legislation.

Another disadvantage of the prior art process described above is that the lime column has to be shut down at intervals of several months, depending upon the composition of the liquid from the coke oven plant. This downtime is necessary since the calcium reaction products in some cases form stoney deposits in the column, particularly on the exchange trays; and these deposits must be removed manually. Attempts have been made to avoid such incrustations by the addition of inhibitors, but the cost of suitable inhibitors is very high. Furthermore, while inhibitors may delay the formation of deposits, they do not prevent the formation of such deposits which eventually must be removed manually.

In another prior art process, the liquid from a coke oven plant is mixed with lime in a separate vessel before entering the stripping column. In this separate vessel, the reaction product is allowed to settle and the discharge of clear liquid is then subjected to ammonia stripping in a known manner. A disadvantage of this process is that the long settling time required entails very large closed tanks. In addition, the ammonia not passing over into the vapor phase is entrained in the moisture in the settled sludge; and this makes it extremely difficult to remove, transport and dump the sludge. While it is possible to gasify the sludge with, for example, water vapor before removal from the vessel, this process is laborious and also expensive.

SUMMARY OF THE INVENTION

In accordance with the present invention, the foregoing disadvantages of prior art methods for removing calcium precipitation products are obviated by precipitating the calcium products in the form of solid granules which are practically anhydrous, these granules being easily removable from the bottom of a reaction vessel.

In carrying out the invention, ammonium and alkaline-earth compounds are introduced into the bottom of a reaction chamber such that the alkaline-earth compounds, in aqueous solution, are immediately and intimately mixed with the ammonium compounds to produce alkaline-earth compound precipitation products in the form of hard granules which are difficutly soluble in water. These granules are then withdrawn from the bottom of the reaction chamber.

Further, in accordance with the invention, the reaction chamber for carrying out the foregoing process comprises a cylindrical chamber portion connected at its open top to a conical, outwardly-flared portion, the two portions being disposed within a liquid bath contained within a surrounding cylindrical tank. The alkaline-earth compounds and the ammonium compounds are introduced into the cylindrical fluidizing chamber by means of coaxial pipes such that the ammonium and alkaline-earth compounds react immediately after their introduction into the cylindrical chamber. The height of the conical portion is such that the major portion of the particulate materials in the chamber will not rise above the top of the conical portion. Rather, they fall downwardly along the wall of the conical portion such that smaller granules will be recycled to the chamber. Liquid is drawn off from the top of the tank within which the chamber is contained; while the formed granules are withdrawn from the bottom of the chamber. These granules comprise relatively large particles which can be easily handled and will not readily adhere to each other or to surrounding elements.

The above and other objects and features of the invention will become apparent from the following detailed description taken in connection with the accompanying single FIGURE drawing which schematically illustrates one embodiment of the invention.

With reference now to the drawing, water from a coke oven plant, for example, containing both free and fixed ammonia passes through conduit 1, heat exchanger 2 and conduit 3 to the top of a distillation column 4. Within the distillation column 4, the water flows down over a number of exchange trays, in accordance with usual practice, where it is brought into contact with vapors arising from a lower distillation column 5.

As the water fows downwardly, it gives up free ammonia and is then collected in a nozzle tray 6. Together with vapors from the bottom distillation column 5, which pass upwardly through the nozzle tray 6 and which also contain ammonia, the liberated ammonia vapors are discharged from the top of the column 4 via conduits 7 and 8 for further use.

An overflow conduit 9 is connected to the top of the nozzle tray 6 and conducts water from which free ammonia has been removed to a receiver 10 which is vented to the conduit 8 via conduit 11. The water in the receiver 10, which contains fixed ammonia, passes through conduit 12 to pump 13 and thence through conduit 14 to the outer nozzle section of a coaxial nozzle assembly 15. The level of the liquid within the receiver 10 is controlled by a liquid level sensing device 21 and a control valve 22. That is, depending upon the level of the liquid within the receiver 10, the valve 22 will be either further opened or further closed to increase or decrease the amount of liquid withdrawn from the receiver.

The calcium hydroxide required for the reaction is supplied from tank 17. This aqueous solution of calcium hydroxide is delivered to the inner nozzle of the nozzle assembly 15 via conduit 18, pump 19 and conduit 20. The amount of calcium hydroxide is controlled by a pH controller 23 which detects the pH of liquid leaving a reactor 16 and controls valve 24 in the conduit 20.

The reaction 16 includes a cylindrical chamber 26 into which the coaxial nozzle assembly 15 discharges. The axis of the nozzle assembly 15 can intersect the longitudinal axis of the chamber 26; or it can be arranged such that the ammonium and calcium compounds enter the chamber 26 tangentially so as to produce a swirling motion. As shown, the cylindrical chamber 26 is provided with an upper portion 25 of generally conical configuration which merges into a cylindrical apron 29 which surrounds the portion 25. The apron 29, the conical portion 25, the chamber 26, and an outlet tube 27 for the chamber are surrounded by an outer cylindrical tank 28. The inner periphery of the tank 28 is spaced from the apron 29 so as to form an annular space therebetween. Water discharged from the top of the conical portion 25 flows slowly and downwardly through the annular space between tank 28 and apron 29 and then rises in the space formed between the conical portion 25 and the apron 29 where it leaves the apparatus via outlet 30.

Any small granules which flow over the top of the conical portion 25 move downwardly in the annular space between elements 28 and 29 and are collected in the conical lower portion of the tank 28 where they are returned, via conduit 31, to the receiver 10. Valve 33 in the conduit 31 controls the rate of flow through the conduit and further controls the size or diameter of the granules leaving the chamber 26 via tube 27. That is, the size of the granules is a function of the upward flow rate within the chamber 26. The reactions between the alkaline-earth compounds and the ammonium compounds take place spontaneously and immediately after mixing at the mouth of the nozzle assembly 15. These reaction products are moved upwardly by the incoming flow, particularly when the reaction solutions are introduced tangentially, and under these conditions spherical granules form. The height of the conical portion 25 above the chamber 26 is chosen so as to give adequate residence time. Depending upon the suspension speed, the smaller granules rise in the conical portion 25 to a height equivalent to about one-quarter of the total height. The transition between the cylindrical chamber 26 and the conically-widened upper portion 25 gives rise to a slowing in the rate of ascent of the granules and a resultant flow-back along the periphery of the conical portion 25. In this manner, recycling of the smaller granules to the chamber is achieved. Additionally, by controlling the flow through valve 33, the speed of ascent of the granules within the conical portion 25 can be controlled. The valve 33, in turn, is controlled by a controller 32, responsive to the rate of flow through conduit 14. In this manner, flow through conduits 14 and 31 can be adjusted to produce the optimum rate of ascent of the granules.

The granules which have built up to a sufficient diameter and weight fall through the outlet tube 27 and an open valve 35 into a collecting tank 36. When tank 36 is full, the valve 35 can be closed and the valve 37 opened to discharge the liquid within the tank 36. After dewatering, the dry granules can then be discharged via valve 38.

The water treated in the reactor 16 still contains some free ammonia (i.e., in the physically-dissolved form). Depending upon the temperature and pressure within the tank 28, some of the ammonia will pass into the vapor phase and is fed via conduit 34 to the vapor conduit 8.

The clear water leaving the outlet 30 flows through conduit 42 to the column 5 and contains calcium hydroxide which adjusts the pH required for distillation in the column 5. This water flows down over a number of exchange trays where it is brought into contact with a stripper vapor injected via conduit 39 and releases its ammonia to this vapor. The water from which ammonia has been removed then leaves the lower portion of the column 5 via conduit 40, gives up part of its heat to the incoming solution in the heat exchanger 2, and is discharged via conduit 41.

Using the process of the invention, it is possible to produce granules having a size which can be adjusted as described. The granules can either be dumped or put to use in some other manner. For example, they can be added to iron ore on a sintering conveyor. Another possibility for reuse of the granules is to burn them in a shaft furnace or fluidized-bed furnace and to use the calcium oxide again for the production of milk of lime. In this way, total recycling is possible.

If the reaction products do not have a tendency for granulation, it is possible to assist the process by the introduction of a contact substance such as quartz, sand or ground calcium carbonate having a particle size preferably of about 0.2 to 1 millimeter. The contact substance can be introduced by depositing it in the tank 17 containing the milk of lime.

It is well known that the suspension speed of the resulting granules depends upon their specific gravity and their individual diameters. If the granules build up to a size which, in order to maintain the suspended state, requires a higher axial upward speed in the chamber 26, then these granules will drop as a result of gravity and may be withdrawn at a suitable point either continuously or intermittently. To produce a granulate with a specific diameter, it is possible to recycle some of the water in the tank 28 back to the chamber 26. This auxiliary flow can be controlled to set the required axial or upward speed and, hence, the diameter of the resulting granules.

The following is a specific example of the invention:

Water from a coke oven plant was pretreated in upper distillation column 4 as described above. The water discharged from the nozzle tray 6 was then introduced into the reactor 16 via the coaxial nozzle assembly 15 at a temperature of 85° C. together with a simultaneous supply of a 3% $Ca(OH)_2$ solution. The amount of milk of lime was adjusted to give a pH of about 10.5 to 11.5 at the reactor outlet 30.

The speed of the flow at the exit end of the coaxial nozzle assembly 15 was 2.0 meters per second; and the upward axial speed in the chamber 26 was 0.14 meter per second. The cone angle α of the conical portion 25 was selected to be 21°; and the residence time in the cone was eighteen minutes.

The chemical content of the water at the reactor inlet and outlet (in milligrams per liter) is given in the following Table I:

TABLE I

| mgr/l | Inlet | Outlet |
|---|---|---|
| Phenol total | 344 | 259 |
| Phenol, water vapor volatile | 300 | 258 |
| $NH_3$ total | 2200 | 1615 |
| $NH_3$ fixed | 1637 | 7 |
| $NH_3$ free | 563 | 1608 |
| Cl | 3373 | 2574 |
| $SO_4$ | 133 | 101 |
| $S_2O_3$ | 1065 | 696 |
| SCN | 278 | 272 |
| CN | 4.9 | 3.1 |

The water leaving the reactor 16 was treated with water vapor in the lower distillation column 5 with the total ammonia content of the outgoing water being 20 milligrams per liter. Granulate discharge was started after about 36 hours of operation with the particle size of the granules being 2 to 3 millimeters.

Table I shows that in addition to the removal of the fixed ammonia from the water derived from a coke oven plant, other substances such as chlorine ions, phenols and thiosulfate were greatly reduced, this reduction having a favorable effect on any subsequent biological treatment.

Other ammonia-containing solutions such as solutions of ammonium sulfate and ammonium sulfite, which occur in waste-gas desulfurization with ammonia-containing solutions, also give positive results with the present invention. Advantageously, the concentration of the ammonia salts in the solution at the coaxial nozzle assembly 15 should be less than 10% by weight. When highly concentrated solutions are used, the maximum concentration at the coaxial nozzle assembly is readily achieved by appropriate recycling of the treated water via conduit 31, receiver 10, conduit 12, pump 13 and conduit 14. Since such solutions usually do not contain any free ammonia, the top distillation stage 4 may be dispensed with.

Although the invention has been shown in connection with certain specific embodiments, it will be readily apparent to those skilled in the art that various changes in form and arrangement of parts may be made to suit requirements without departing from the spirit and scope of the invention.

We claim as our invention:

1. A process for the granulation of precipitation products formed from the reaction of ammonium compounds with alkaline-earth compounds, which comprises introducing into a liquid-filled reaction chamber above the bottom thereof a first aqueous stream containing the said ammonium compounds and introducing a second aqueous stream containing the said alkaline-earth compounds such that the said alkaline-earth compounds are immediately and intimately mixed with the said ammonium compounds to effect a liquid phase reaction and form alkaline-earth compound precipitation products in the form of granules which are difficultly soluble in water, withdrawing the said granules from the bottom of the said reaction chamber and separately recovering from said reaction chamber a third aqueous stream containing an essentially particle-free aqueous solution of free ammonia and a fourth aqueous stream containing an aqueous solution of free ammonia and suspended particles of said precipitation products.

2. The process of claim 1 including the step of introducing the said first stream and the said second stream separately into the said reaction chamber through a coaxial nozzle assembly.

3. The process of claim 2 wherein said coaxial nozzle assembly introduces said first stream and said second stream into the said reaction chamber tangentially.

4. The process of claim 1 including the step of introducing into the said reaction chamber a fine grained contact substance, disbursed in said second stream, said contact substance selected from the class consisting of quartz, sand and ground calcium carbonate, having a particle size of about 0.2 to 1 millimeter.

5. The process of claim 1 including the step of adjusting the rate of ascent of the liquid in the said reaction chamber such that the resulting granules are kept in a suspended state until they reach a desired size.

6. The process of claim 1 including the step of controlling the flow rate of the said second stream into the said reaction chamber as a function of the pH of the said third aqueous stream.

* * * * *